US 7,106,585 B2

(12) United States Patent
Lin

(10) Patent No.: US 7,106,585 B2
(45) Date of Patent: Sep. 12, 2006

(54) HOLDING DOCK FOR PORTABLE COMPUTERS

(75) Inventor: Roger Lin, Taipei (TW)

(73) Assignee: Cooler Master Co., Ltd., Junghe (TW)

( * ) Notice: Subject to any disclaimer, the term of this patent is extended or adjusted under 35 U.S.C. 154(b) by 277 days.

(21) Appl. No.: 10/775,150

(22) Filed: Feb. 11, 2004

(65) Prior Publication Data

US 2005/0174731 A1   Aug. 11, 2005

(51) Int. Cl.
*G06F 1/16* (2006.01)
(52) U.S. Cl. ........................................ 361/686; 361/683
(58) Field of Classification Search ................ 361/683, 361/686
See application file for complete search history.

(56) References Cited

U.S. PATENT DOCUMENTS 5,835,344 A * 11/1998 Alexander .................. 361/683
6,084,769 A * 7/2000 Moore et al. ............... 361/687
6,626,543 B1 * 9/2003 Derryberry .................. 353/119
6,646,864 B1 * 11/2003 Richardson ................. 361/681
6,952,343 B1 * 10/2005 Sato ........................... 361/686

FOREIGN PATENT DOCUMENTS

TW            562177         11/2003

\* cited by examiner

*Primary Examiner*—Yean-Hsi Chang
(74) *Attorney, Agent, or Firm*—Birch, Stewart, Kolasch & Birch, LLP

(57) ABSTRACT

A holding dock for portable computers to house a portable computer and disperse heat includes an upper lid, a holding surface, sidewalls and a hub to form a heat dissipation space. Heated air generated by the computer may enter the heat dissipation space through a heat dissipation section formed on the holding surface. The hub has a fan mounted thereon to draw the heated air to provide heat dissipation effect for the portable computer. The hub further can connect other electronic devices to the portable computer. The heat dissipation space can also house the portable computer to facilitate carrying and storing.

9 Claims, 8 Drawing Sheets

HOLDING DOCK FOR PORTABLE COMPUTERS

FIELD OF THE INVENTION

The present invention relates to a holding dock for portable computers and particularly to a holding dock that has an upper lid, a holding surface, and two sidewalls to form a heat dissipation space.

BACKGROUND OF THE INVENTION

The popularity of portable computers has risen dramatically during recent years. They may be compact but are equipped with almost the same facilities as regular desktop computers. Hence heat the dissipation space has to be reduced, which in turn also reduces dispersion which is generally not as efficient as desktop computers. Usage over a short period of time might not result in overheating; however prolonged use on a fixed spot with no way for thermal energy to effectively escape can cause the computer to shutdown (self protection). Frequent occurrence shortens the service life of a portable computer.

ROC patent publication No. 562177 entitled "Heat dissipation base dock for portable computers" discloses a technique which uses an aluminum plate with good conducting properties. The aluminum plate has a front end bent downwards to form an inclined angle for the plate surface so that a heat dissipation space is formed thereunder. The plate surface has heat dissipation vents. A fan is located thereunder so that when the portable computer is rested on the aluminum plate for use, the aluminum plate absorbs heat, and the fan generates cool air to carry away the thermal energy to achieve heat dissipation. While providing a means for heat dissipation in the portable computer, the aluminum plate is too bulky and inconvenient to carry. It also cannot be connected to other electronic equipment. There is still room for improvement.

SUMMARY OF THE INVENTION

The primary object of the invention is to provide a holding dock for a portable computer that has an improved heat dissipation effect. The holding dock according to the invention has an upper lid, a holding surface, sidewalls and a detachable hub to form a heat dissipation space which allows thermal air to flow. A heat dissipation fan is mounted on a sidewall to dispel hot air. The heat dissipation space may also hold a portable computer to facilitate carrying and storing.

Another object of the invention is to provide a holding dock for portable computers for connecting to a plurality of electronic devices. A hub is mounted on one sidewall to enable the portable computer to connect external electronic devices.

Further scope of the applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE PREFERRED EMBODIMENTS

Figure 1:
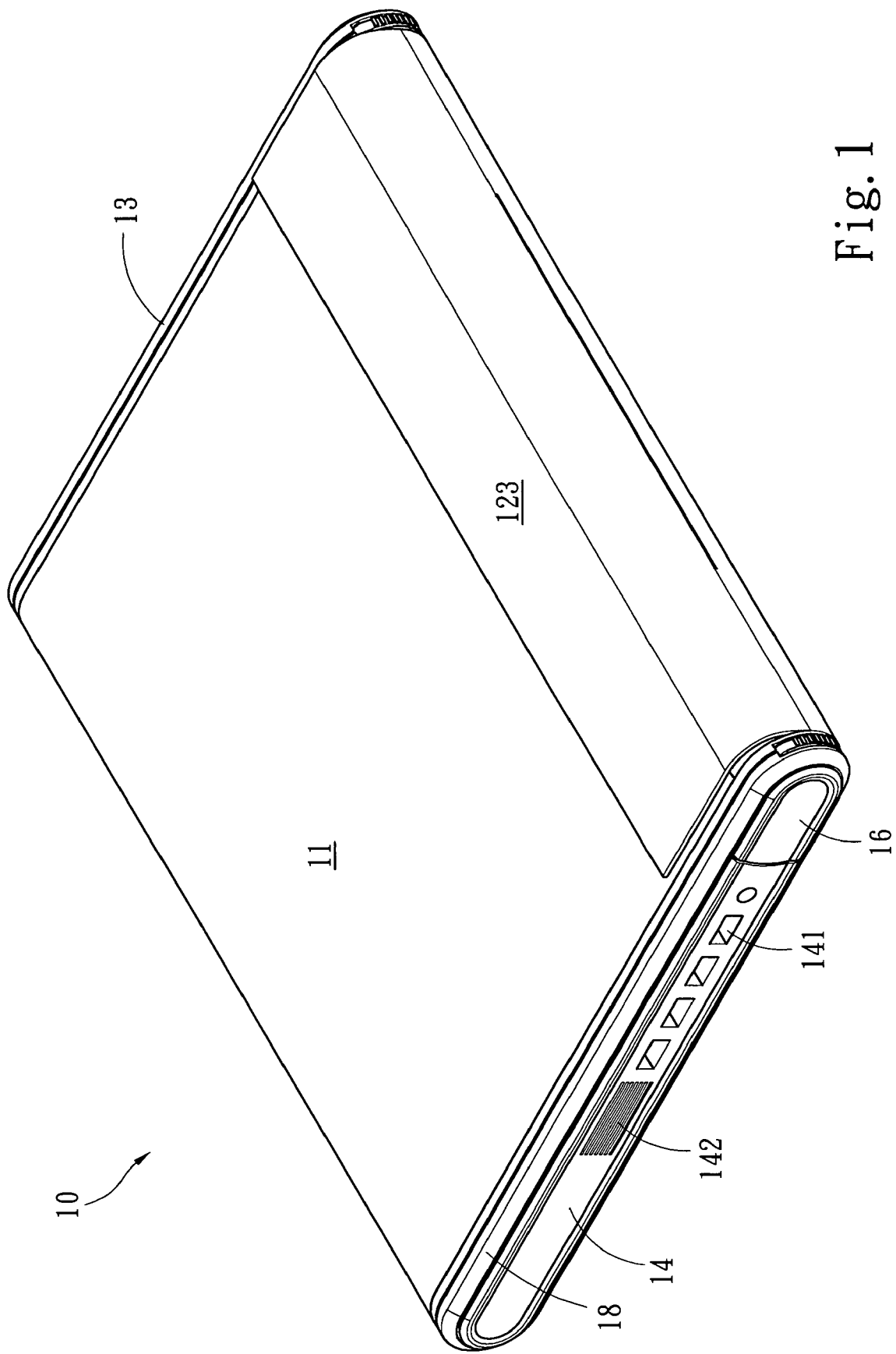
FIG. 1 is a perspective view of the present invention.
Figure 2:
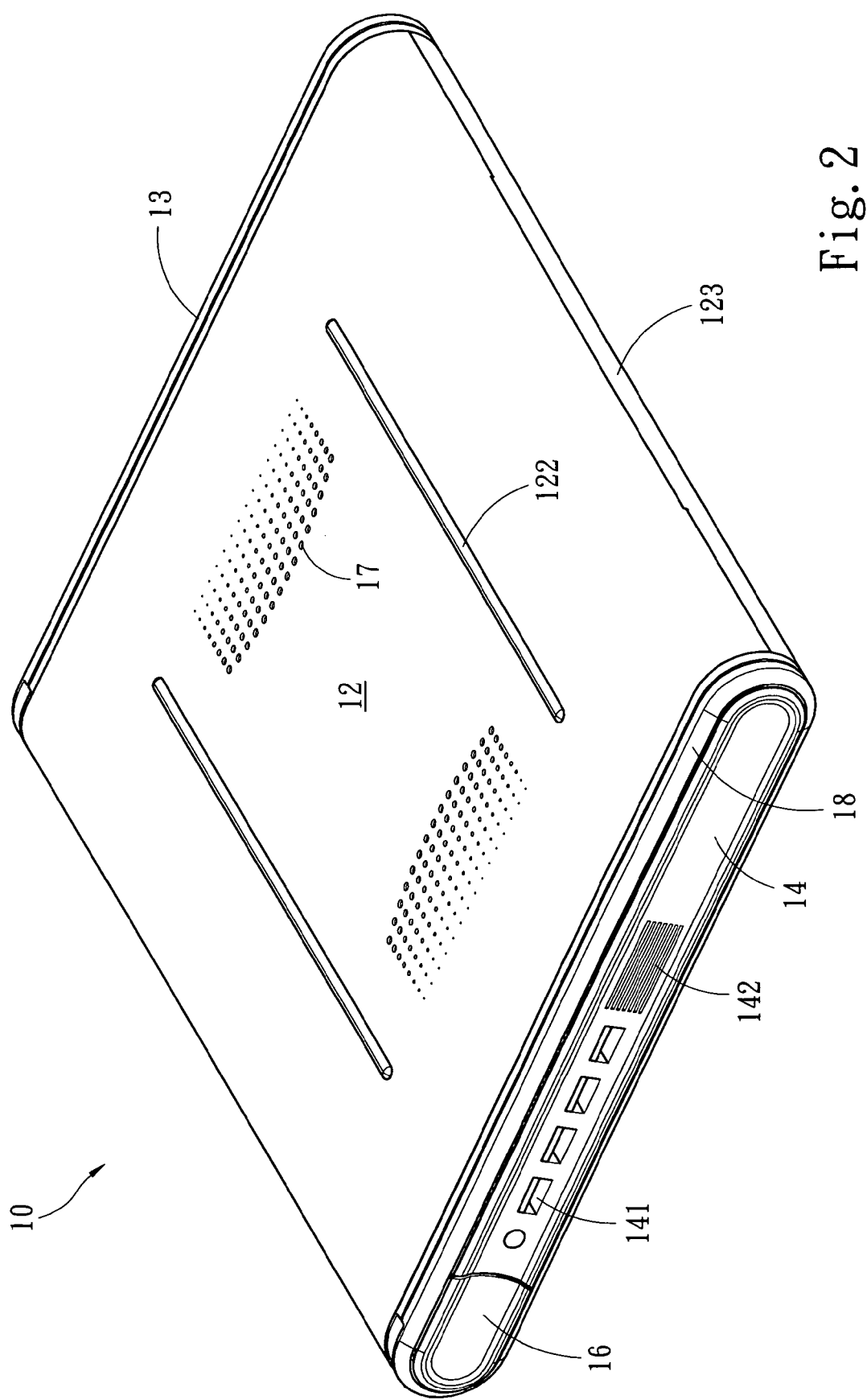
FIG. 2 is a perspective view of the present invention from the bottom side.
Figure 3:
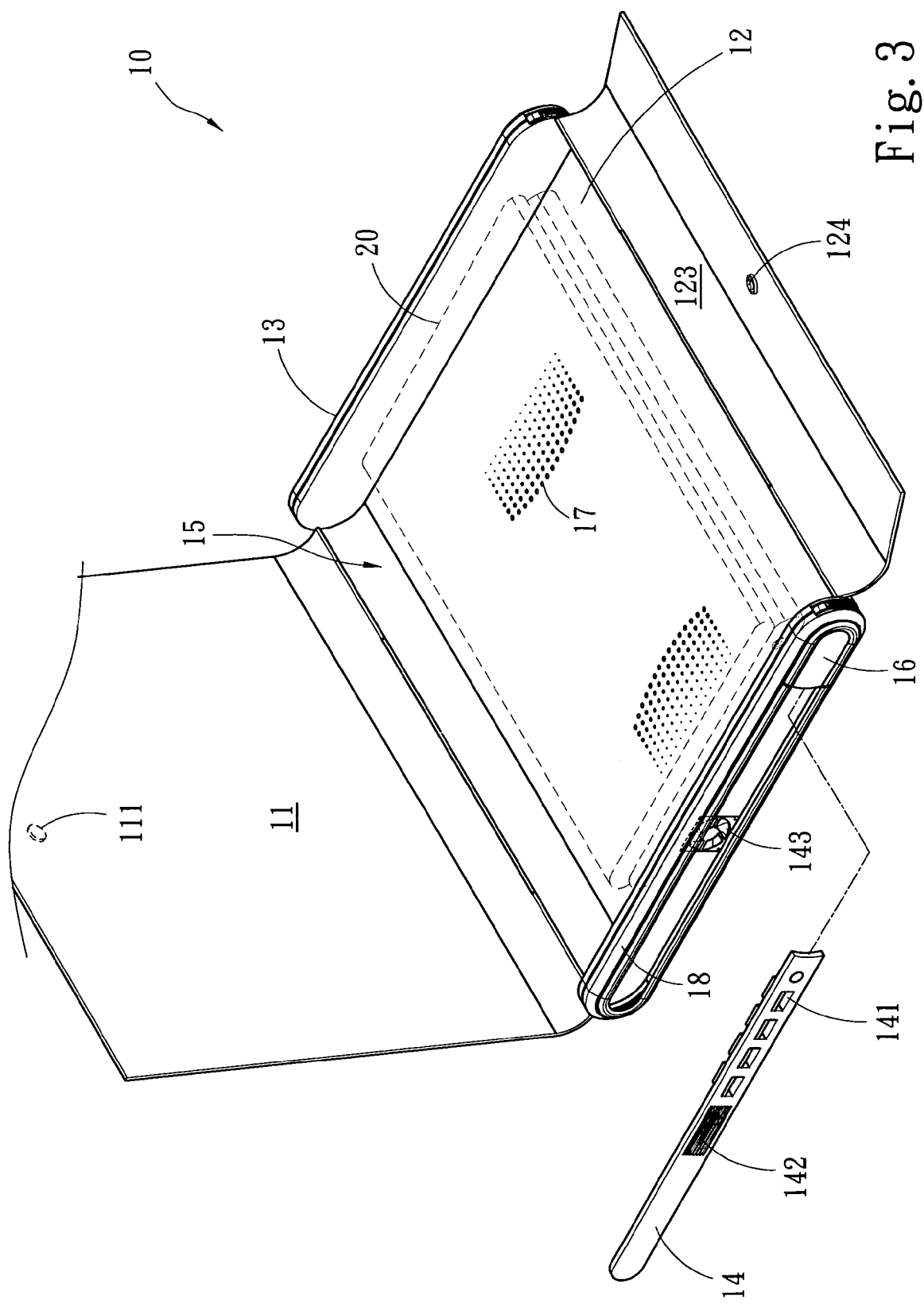
FIG. 3 is an exploded view of the present invention.

Referring to FIGS. 1, 2 and 3; the holding dock 10 according to the invention includes an upper lid 11, a holding surface 12, sidewalls 13 and 18, and a detachable hub 14. The holding surface 12 has heat dissipation sections 17 which have a plurality of vents for dispelling heat generated by a portable computer 20 resting on the holding surface 12.

Referring to FIG. 3, the holding surface 12 is pivotally engaged with a coupling plate 123 to fasten the upper lid 11 when it is laid on the holding surface 12. The coupling plate 123 and the upper lid 11 have respectively a coupling member 124 and a coupling element 111 that correspond to and can latch on to each other. In addition, the upper lid 11, holding surface 12 and sidewalls 13 and 18 form heat dissipation space 15. Besides dispersing heat for a portable computer 20, the heat dissipation space 15 can also house the portable computer 20 to facilitate carrying. The holding surface 12 also has anti-slipping sections 122 (referring to FIG. 2) to prevent the holding dock 10 from slipping when rested on a flat surface, and also avoids scratching the holding surface 12. The hub 14 is located on a sidewall 18 and has a plurality of insertion slots 141 to enable the portable computer 20 to connect external electronic devices (not shown in the drawings). A heat dissipation fan 143 is mounted on the sidewall 18 to facilitate heat dissipation of the portable computer 20. The hub 14 has heat dissipation vents 142 matching the fan 143 for dispelling heated air.

Figure 4:
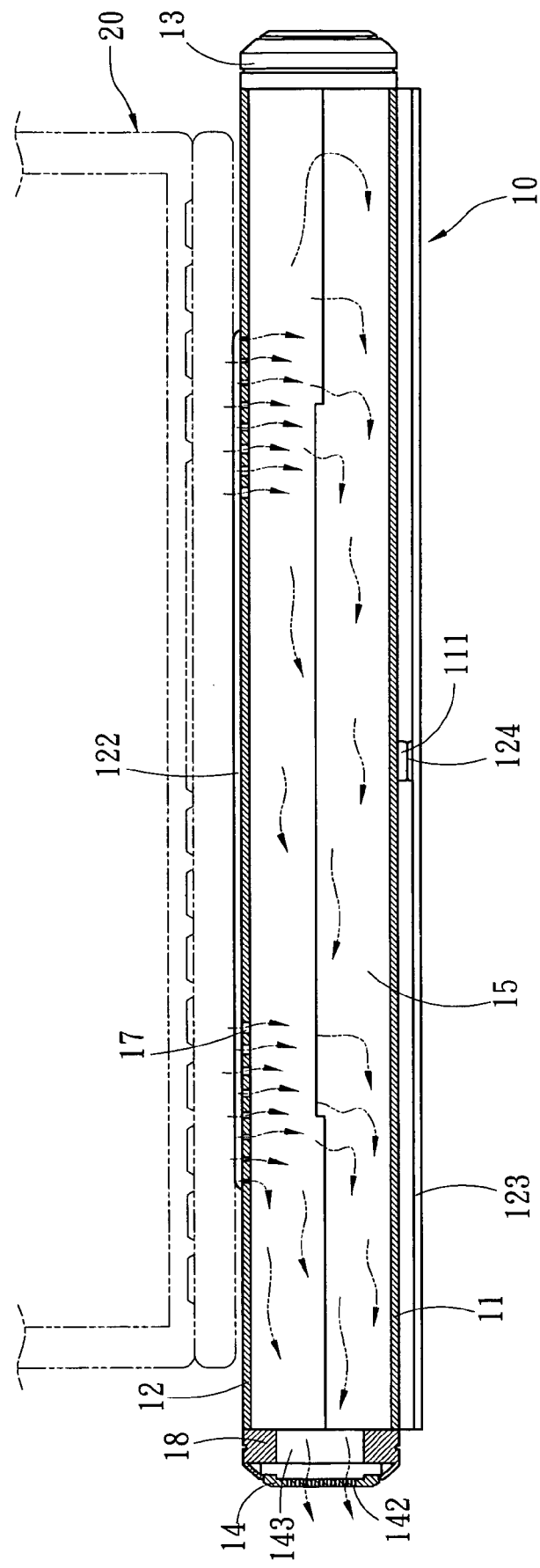
FIG. 4 is a schematic view of the invention showing heat dispersing direction.

Referring to FIG. 4, when the portable computer 20 is resting on the holding dock 10, high temperatures generated by the portable computer 20 enters the heat dissipation space 15 through the heat dissipation sections 17, the heated air is drawn by the fan 143 and dispelled outside through the heat dissipation vents 142.

Figure 5:
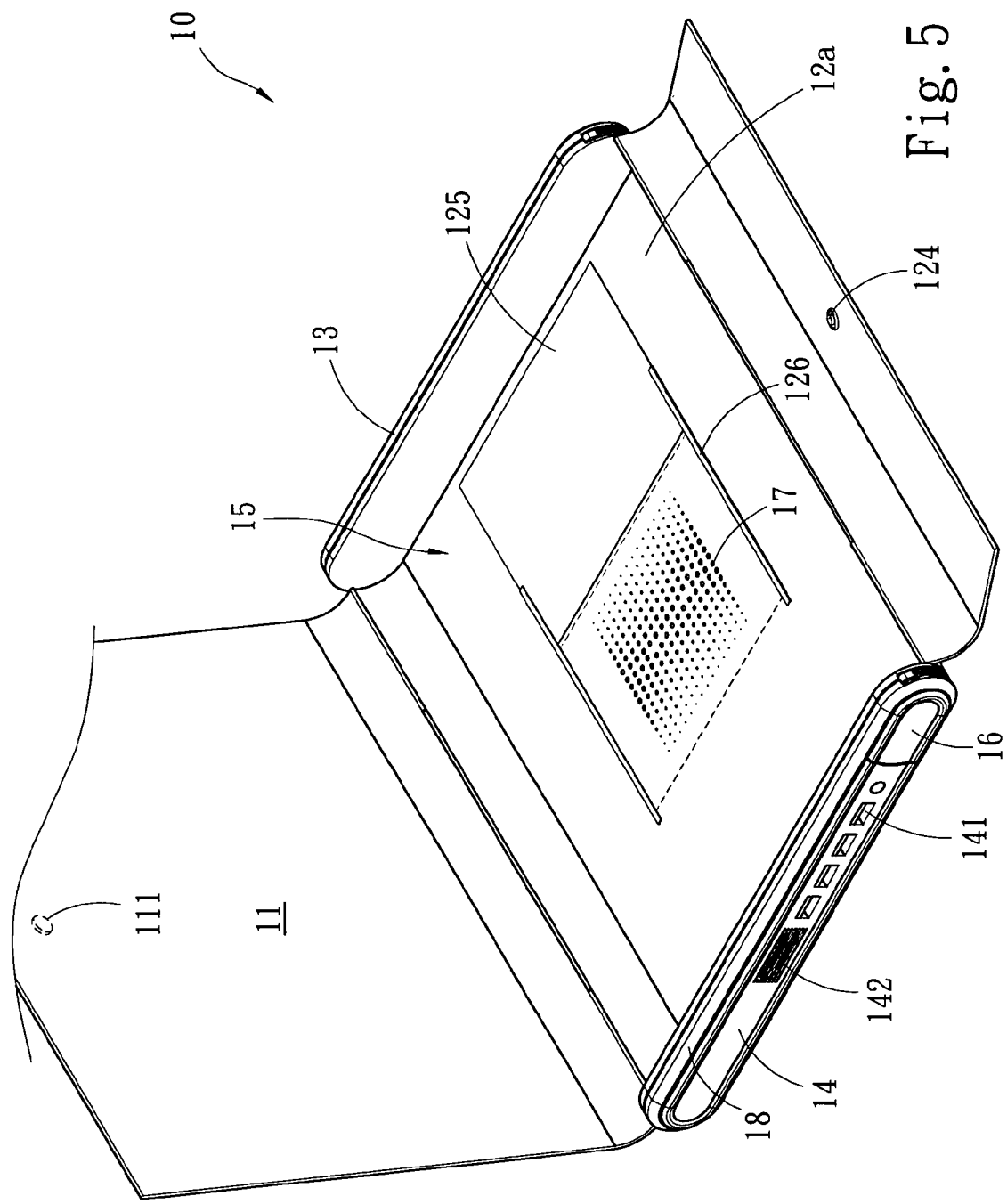
FIG. 5 is a schematic view of a first embodiment of the invention.
Figure 6:
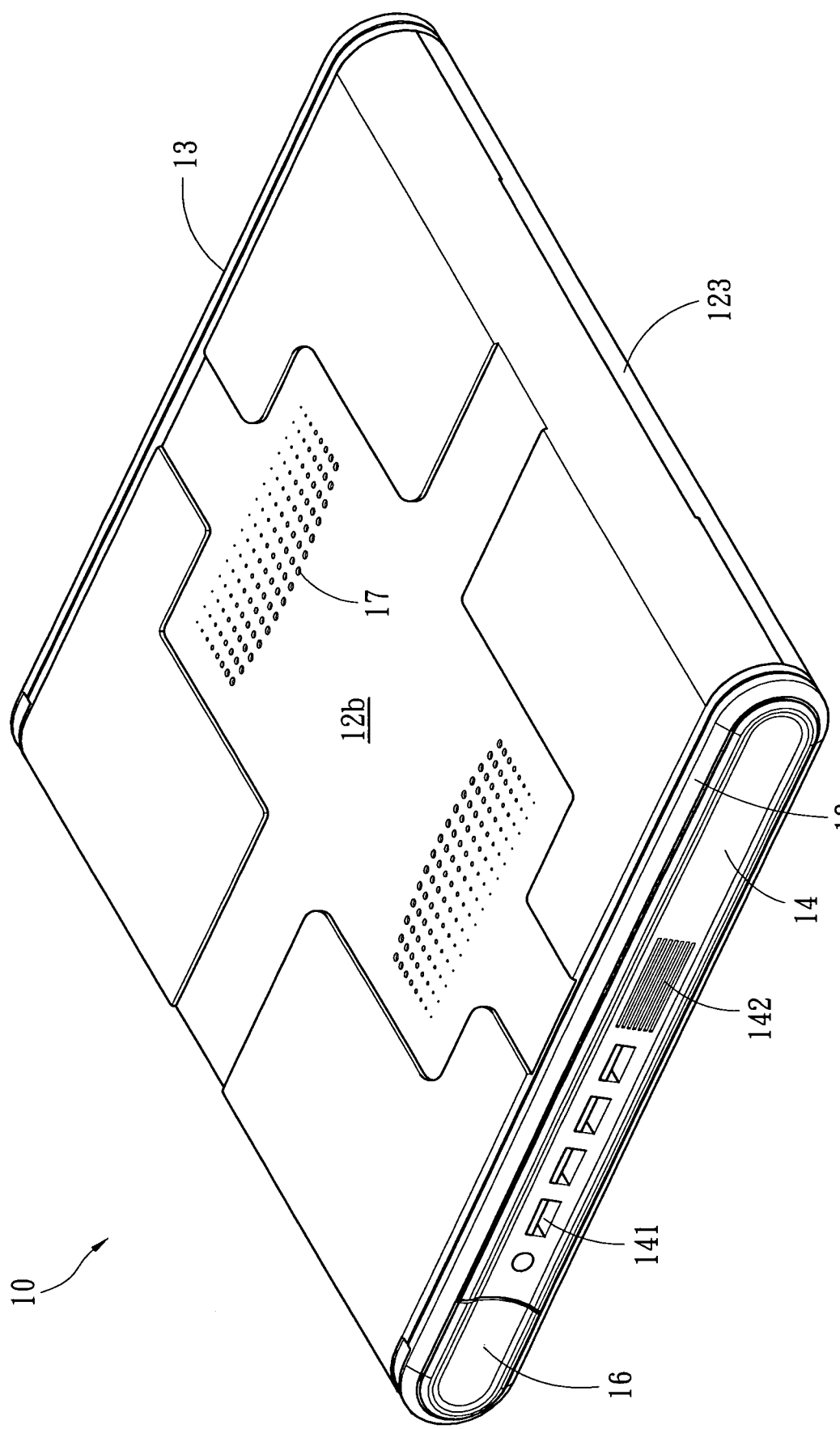
FIG. 6 is a schematic view of a second embodiment of the invention.

Refer to FIGS. 5 and 6 for a second embodiment of the invention. A sliding lid 125 is added to the heat dissipation sections 17 on the holding surface 12a to mate the tracks 126. Such a structure provides water-proofing for the portable computer inside the holding dock. FIG. 6 shows that the holding surface 12b is formed with an indented recess to facilitate thermal airflow from the heat dissipation sections 17 into the holding dock 10 to further improve heat dissipation.

Figure 7:
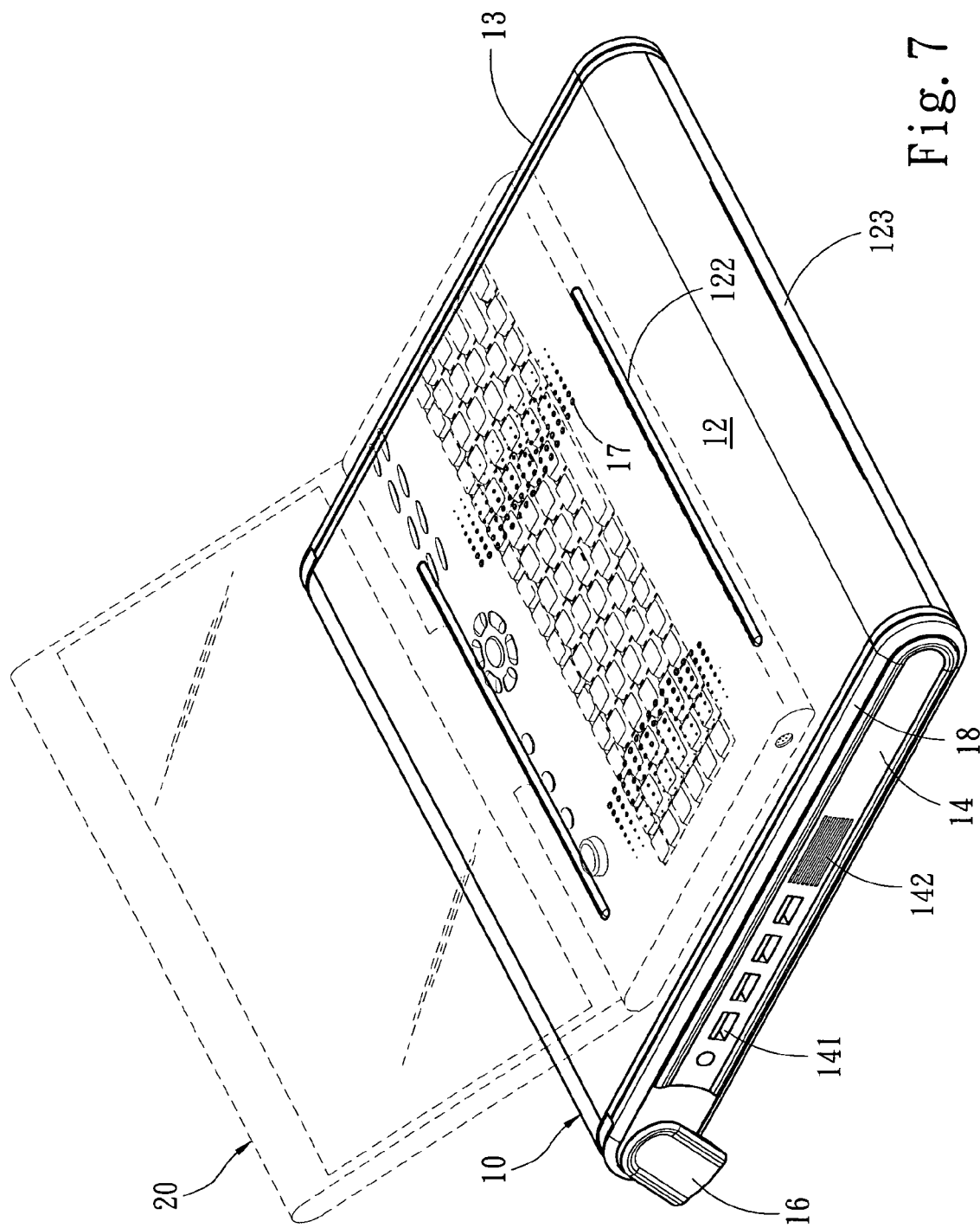
FIG. 7 is a schematic view of the invention in a use condition.

Referring to FIG. 7, foot racks 16 are provided on two corresponding ends of the sidewall 13 that can turn to extend from the bottom side of the holding dock 10 so that an inclined surface is formed to conform to ergonomics when in use.

Figure 8:
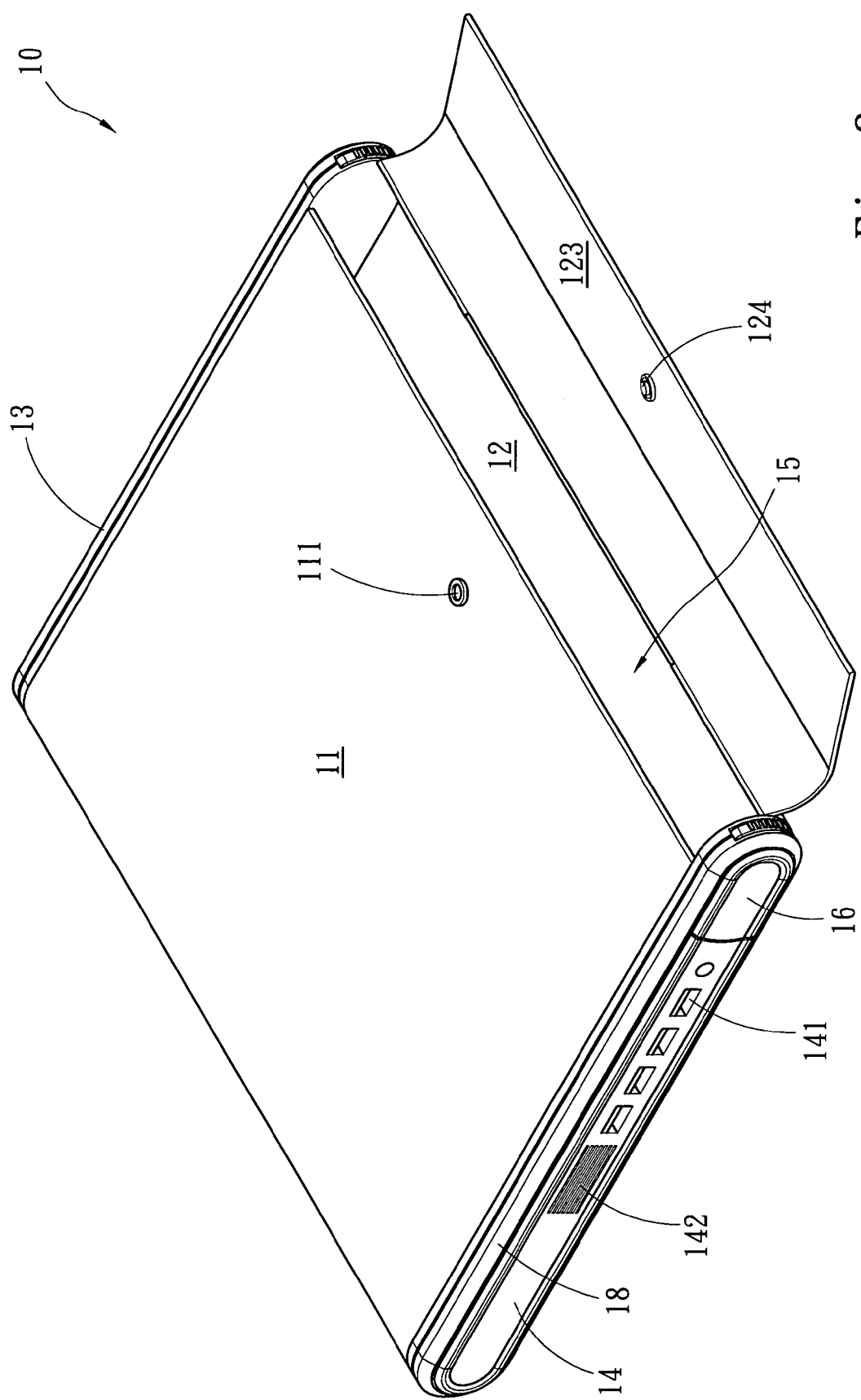
FIG. 8 is a schematic view of a third embodiment of the invention.

Refer to FIG. 8 for another embodiment of the invention. The upper lid 11 is fixedly mounted on the holding surface 12. The coupling plate 123 is pivotally engaged with the holding surface 12, and has respectively a coupling member 124 and a coupling element 123 that may be coupled to form a heat dissipation space 15 which opens and closes to hold a portable computer (not shown in the drawing).

While the preferred embodiments of the invention have been set forth for the purpose of disclosure, modifications to the disclosed embodiments of the invention as well as other embodiments thereof may occur to those skilled in the art. Accordingly, the appended claims are intended to cover all embodiments which do not depart from the spirit and scope of the invention.

What is claimed is:

1. A holding dock for portable computers, comprising:
    a holding surface for holding a portable computer having a heat dissipation section;
    an upper lid;
    two sidewalls; and
    a detachable hub mounted on at least one said two sidewalls for connecting to external electronic devices;
    wherein said upper lid, said holding surface, and said two sidewalls form a heat dissipation space to facilitate flowing of heated air; and
    wherein said portable computer is allowed to be housed in said heat dissipation space.

2. The holding dock for portable computers of claim 1, further having a heat dissipation fan mounted on one of the two sidewalls.

3. The holding dock for portable computers of claim 1, wherein said heat dissipation section has vents.

4. The holding dock for portable computers of claim 1, wherein said holding surface has a sliding lid and tracks, said sliding lid being movable along said tracks to cover said heat dissipation section.

5. The holding dock for portable computers of claim 1, wherein said holding surface has an indented recess.

6. The holding dock for portable computers of claim 1, further having a foot rack located on a sidewall and said hub corresponding to a center of the holding dock.

7. The holding dock for portable computers of claim 1, wherein said holding surface has an anti-slipping section to prevent said holding dock from slipping.

8. The holding dock for portable computers of claim 1, wherein said upper lid is pivotally engaged with one end of said holding surface and can turn therewith, said holding surface being pivotally engaged with a coupling plate which has a coupling member able to engage with a coupling element located on said upper lid to open or close said heat dissipation space.

9. The holding dock for portable computers of claim 1, wherein said upper lid and said holding surface are fixed, said holding surface being pivotally engaged with a coupling plate which has a coupling member that can engage with a coupling element located on said upper lid to open or close said heat dissipation space.

* * * * *